United States Patent [19]

Kusiak et al.

[11] Patent Number: 4,934,288
[45] Date of Patent: Jun. 19, 1990

[54] TOOL FOR FERTILIZING PLANTS, TREES AND SHRUBS

[76] Inventors: Joseph W. Kusiak; Beverly A. Kusiak, both of 4288 Wintergreen, Troy, Mich. 48098

[21] Appl. No.: 313,989

[22] Filed: Feb. 22, 1989

[51] Int. Cl.[5] .......................... A01C 5/02; A01C 15/02
[52] U.S. Cl. ...................................... 111/92; 111/7.1; 47/48.5
[58] Field of Search .................... 47/48.5; 111/106, 92, 111/7.1, 93, 94, 95, 96, 97

[56] References Cited

U.S. PATENT DOCUMENTS

| 12,465 | 2/1855 | Barnhart | 111/95 |
| 4,585,072 | 4/1986 | Martinez | 111/106 |

FOREIGN PATENT DOCUMENTS

| 161795 | 3/1955 | Australia | 111/106 |
| 770940 | 9/1934 | France | 111/92 |
| 514248 | 1/1957 | Italy | 111/92 |
| 211759 | 2/1924 | United Kingdom | 111/92 |

*Primary Examiner*—Danton D. DeMille
*Attorney, Agent, or Firm*—Charles J. Prescott

[57] ABSTRACT

A device for preparing a deep fertilization hole in soil and for then facilitating dispensing a quantity of fertilizer into the hole formed after the device is used to remove a column of soil in forming the hole. The device includes a hole-making tube, an anvil tube, and a soil ejection rod, all coaxial one to another. The anvil is releasably connectable to the upper end of the hole-making tube. The anvil transmits hammering forces applied against its upper end to drive the lower end of the hole-making tube into the soil. The soil ejection rod is slidably translatable longitudinally within the hole-making tube and is provided to push the column of soil from the hole-making tube which has been removed in forming the fertilizer hole. Removal of the anvil facilitates use of the hole-making tube to deposit the fertilizer into the hole. The soil ejection rod having a scalloped, tooth-like soil ejection plate may be used to loosen the soil at the walls of the fertilization hole prior to reinsertion of the hole making tube for purposes of improved fertilizer absorption within the hole.

10 Claims, 1 Drawing Sheet

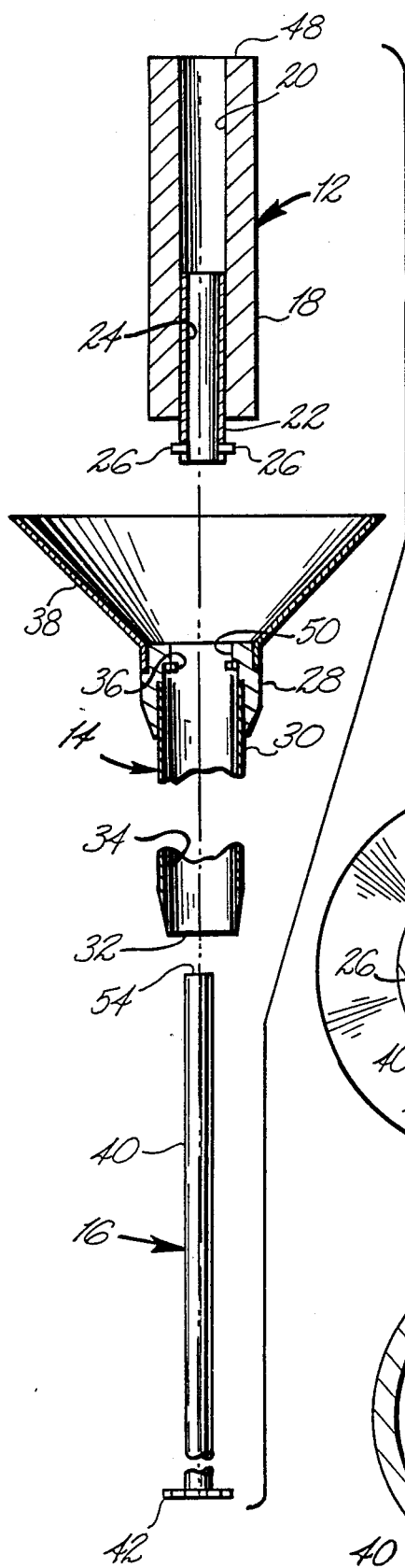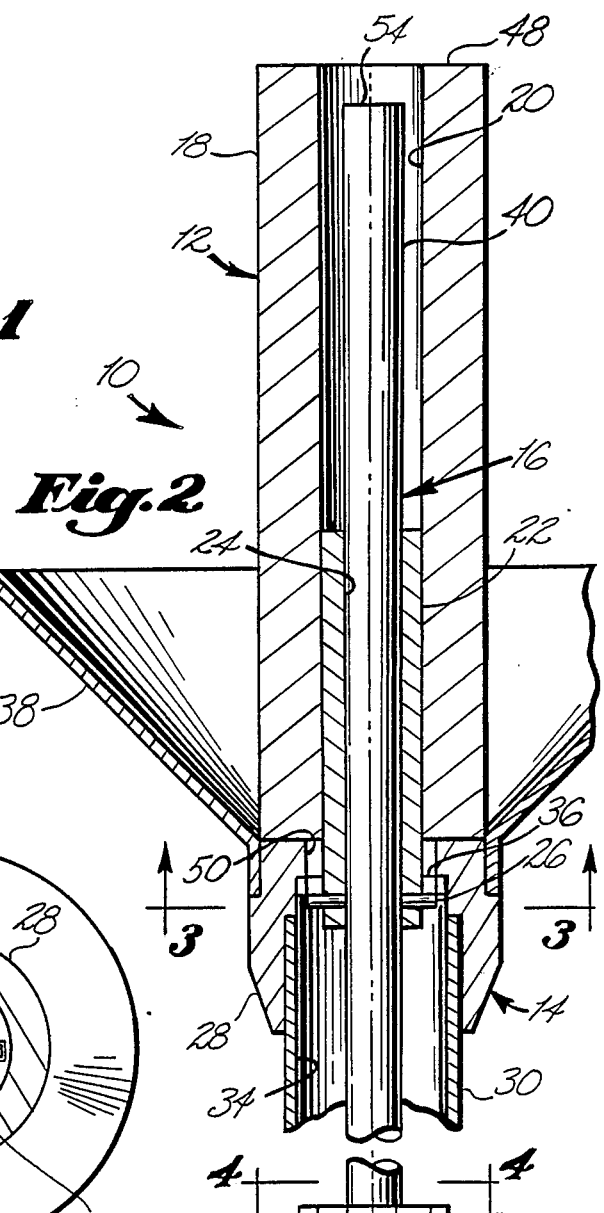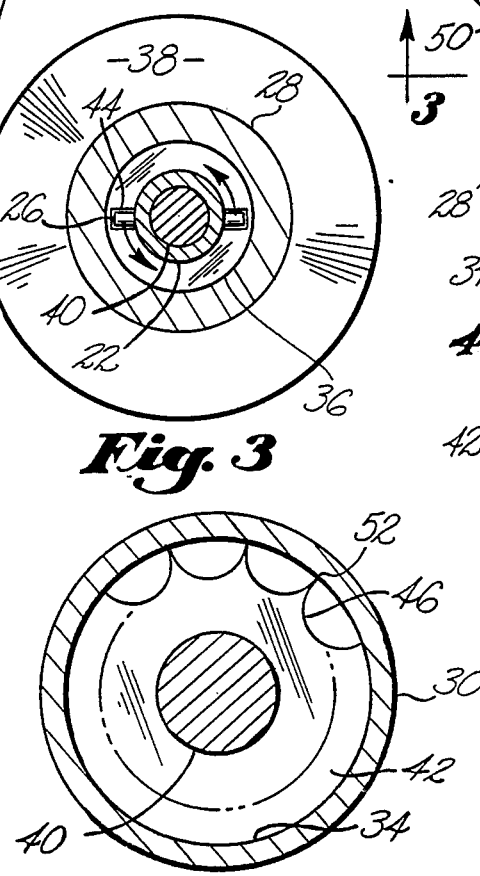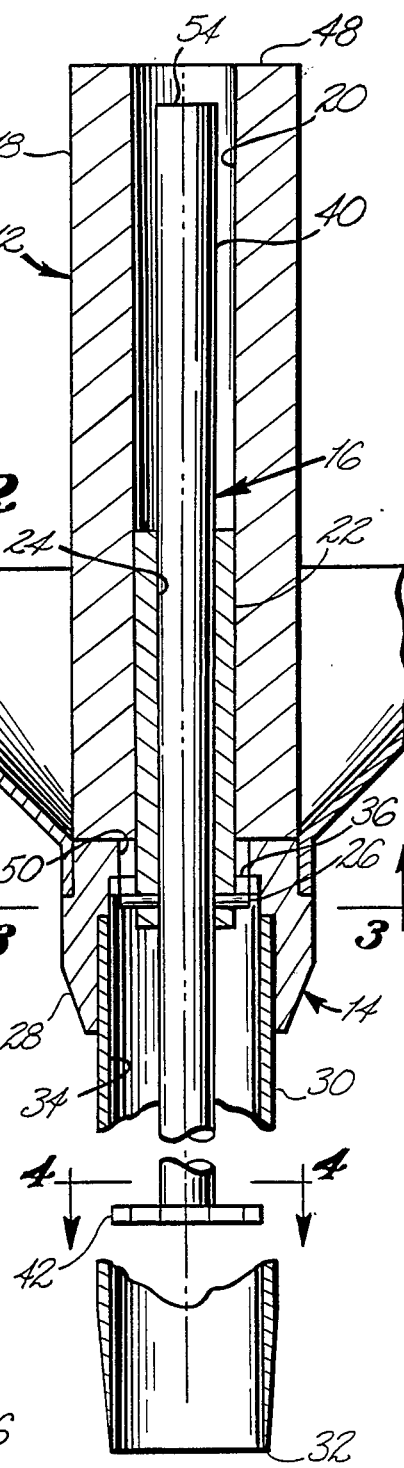
U.S. Patent   Jun. 19, 1990   4,934,288
Fig. 1
Fig. 2
Fig. 3
Fig. 4

TOOL FOR FERTILIZING PLANTS, TREES AND SHRUBS

BACKGROUND OF THE INVENTION

This invention relates generally to hand operated fertilization tools, and more particularly to a fertilization tool which removes a column of soil and then facilitates deposit of a quantity of fertilizer into the hole.

The effective fertilization of plants, trees, and shrubs can best be accomplished by depositing granular fertilizers deep into the ground so that the fertilizer may readily reach deeply located roots that usually cannot be reached by conventional methods of fertilizing. Current methods of fertilizing, which include fertilizer spikes, injection of liquids into the soil, and application of either liquid or granular fertilizer to the surface or just slightly below the surface, are limited in their effectiveness because they either do not reach deep enough, or only provide for application of small amounts of fertilizer which does not facilitate continuous feeding over time.

The present invention provides for infusion of a substantial amount of fertilizer into the ground which, as it dissolves, provides for continuous feeding over an extended period of time. This invention is unique in that it provides a simple tool and method for deeply fertilizing trees, shrubs and plants. Other available methods for achieving deep fertilization require sophisticated, bulky, and costly apparatus that must be driven by powered equipment. These types of tools are generally impractical for the typical home gardener, arborist or gardening hobbiest.

Examination of the prior art reveals the following disclosures for depositing granular fertilizers into the ground:

U.S. Pat. No. 4,549,611 to Mills provides for cutting a shallow gutter at the surface of the soil into which fertilizer is then deposited;

U.S. Pat. No. 4,079,680 to Davis teaches a type of hoe that trenches and loosens the soil while fertilizer is injected to mix in with the loosened dirt behind the trenching tool. (This tool applies fertilizer to surface and sub-surface levels only);

U.S. Pat. No. 4,246,854 to Lempa,Jr. is directed to a fertilizer injection tool which is used to spade a shallow hole in the ground and then injects fertilizer in the ground and is capable of applying fertilizer at near-surface levels only;

U.S. Pat. No. 3,695,193 to Maier teaches a device that uses an electrically powered hole-boring arbor to produce a hole in the ground and then fill the hole with granular fertilizer which produces an end result similar to the present invention but the result is accomplished by an entirely different mechanism;

U.S. Pat. No. 2,170,598 to Sims discloses an apparatus to produce only a shallow hole in the ground with a built-in mechanism to allow filling the hole with fertilizer;

U.S. Pat. No. 2,325,939 to Buehler accomplishes much the same function a Sims but by a different mechanical means. Both Sims' and Buehler's disclosures concentrate on the automatic injection of fertilizer into the hole. The present invention concentrates on the depth of the hole and maintaining the native condition of the soil.

Other pertinent disclosures reviewed include:

U.S. Pat. No. 2,370,744 to Molinare
U.S. Pat. No. 3,014,443 to Keyser
U.S. Pat. No. 3,170,522 to Gregory
U.S. Pat. No. 3,504,647 to Krarup
U.S. Pat. No. 3,771,474 to Elston
U.S. Pat. No. 3,815,526 to Christopherson Each of these involves some variation of a tool to produce only a shallow hole in the ground and filling such hole with some granular substance be it fertilizer or rodent poison.

The present invention presents significant improvements over the above-mentioned devices in its ability to produce a deep hole while maintaining the native condition of the soil and permitting a slow, timely release of fertilization and access to deep roots that are not accessible by the above-mentioned disclosures.

SUMMARY OF THE INVENTION

This invention is directed to a device for preparing a fertilization hole in soil and for then facilitating dispensing a quantity of fertilizer into the hole formed after the device is used to remove a column of soil in forming the hole. The device includes a hole-making tube, an anvil, and a soil ejection rod, all coaxial one to another. The anvil tube is releasably connectable to the upper end of the hole-making tube. The anvil transmits hammering forces applied against its upper end to drive the lower end of the hole-making tube into the soil. The soil ejection rod is slidably translatable longitudinally within the hole-making tube and is provided to push the column of soil from the hole-making tube which has been removed in forming the fertilizer hole. Removal of the anvil thereafter facilitates use of the hole-making tube to deposit the fertilizer into the hole.

It is therefore an object of this invention to provide a tool readily adapted and easily used to fertilize outdoor plants, trees and shrubs by first producing a relatively deep hole in the ground and then, using the same tool, by facilitating injecting a suitable, flowable granular or liquid type fertilier into the hole.

It is another object of this invention to facilitate getting the fertilizer down deep to the roots of the plant while maintaining the native condition of the soil so that the fertilizer, as it dissolves, is able to easily penetrate the surrounding soil and reach the root structure of the plant for effective feeding.

In accordance with these and other objects which will become apparent hereinafter, the instant invention will now be described with reference to the accompanying drawings in which:

BRIEF DESCRIPTION OF THE DRAWINGS

FIG. 1 is an exploded partially broken longitudinal section view of the invention.

FIG. 2 is a longitudinal section view of the assembled invention.

FIG. 3 is a section view in the direction of arrows 3-3 in FIG. 2.

FIG. 4 is a section view in the direction of arrows 4-4 in FIG. 2.

DETAILED DESCRIPTION OF THE INVENTION

Referring now to the drawings, the preferred embodiment of the invention is shown generally at numeral 10 and includes an anvil 12, a hole-making tube 14, and a soil ejection rod 16. All three components, 12, 14 and 16 have longitudinal, coaxial axes as best seen in FIGS. 1 and 2.

The anvil 12 includes an anvil tube 18 having an elongated longitudinal aperture 20 into which is rigidly connected locking pin retainer tube 22 having longitudinal aperture 24 as shown. Transversely disposed adjacent the lower end of the locking pin retainer tube 24 are locking pins 26 which are rigidly connected therein as shown. Note that locking pins 26 do not encroach upon longitudinal aperture 24.

The hole-making tube 14 includes an elongated, relatively thin-walled rigid tube 30 having a cylindrical interior surface 34 and a generally beveled and sharpened lower end 32 as best seen in FIG. 2. Rigidly connected to the upper end of tube 30 is cap 28 having a longitudinal aperture 50 structured to be rigidly connected around the upper end of tube 30. Secured within aperture 50 is slotted washer 36 which, as best seen in FIG. 3 includes opposing slots 44 sized and positioned to have locking pins 26 passed therethrough as locking pin retainer tube 22 is inserted into aperture 50 whereby the upper surface of cap 28 contacts the lower end surface of anvil tube 18 as shown in FIG. 2. Securing anvil 12 to hole-making tube 14 is accomplished by thereafter rotating one to another about their common axis so that locking pins 26 are misaligned with slots 44. In the preferred embodiment, funnel 38 is also provided rigidly connected to the outer peripheral surface of cap 28 as shown.

Soil ejection rod 16 is formed of a long, rigid and slender rod 40 having a soil ejection plate 42 rigidly connected in transverse orientation to the lower end of rod 40. As best seen in FIG. 4, the soil ejection plate 42 is formed of a rigid sheet of metal material having scallops 46 formed in the periphery thereof so that a series of teeth 52 are formed having a circular profile slidably engaged within and against surface 34 of tube 30. The purpose and function of these teeth 52 will be described herebelow.

Rod 40 is sized and structured so as to slidably translate within aperture 24 of the locking pin retainer tube 22. The soil ejection rod 16 is thus slidably translatable longitudinally from an upper position wherein rod 40 extends just to the upper surface 48 of anvil tube 18 and wherein soil ejection plate 42 is positioned upward from the lower end of tube 30, to a second position wherein soil ejection plate 42 is positioned very near the lower, beveled end 32 of tube 30. Again, the purpose and function of the positioning of soil ejection rod 16 will be more fully described herebelow.

With the device 10 fully assembled as shown in FIG. 2, the beveled lower end 32 of tube 30 is placed atop the ground where a fertilizer hole is desired to be formed. Grasping the device 10 about anvil tube 18, the user then impacts the upper end 48 of anvil tube 18 with a hammer or the like in repeated downward impacts. This impact force is translated directly to cap 28 and thus serves to drive the beveled end 32 of tube 30 into the soil. Again, the beveled lower end 32 sharpened thusly facilitates penetration into the soil as a column of soil is forced into tube 30 and against its inner surface 34. Note that the surrounding soil is only compressed a maximum amount equal to the thickness of tube 30. As the column of soil is moved upwardly within tube 30, the soil ejection rod 16 is, likewise displaced upwardly within the locking pin retainer tube 22 of anvil 12.

At the point at which the upper end 54 of rod 40 reaches the upper end 48 of anvil tube 18, hammering against surface 48 should cease and the entire device 10 should then be removed from the ground by grasping anvil tube 18. Some lateral force may be exerted on the anvil 12 to dislodge tube 30 from the surrounding soil to facilitate removal. Thereafter, anvil 12 is separated from the hole-making tube 14 by reversing the assembly process previously described. The column of soil contained within tube 30 may now be ejected by the downward movement of the soil ejection rod 16, facilitated by light hammering of the upper end surface 54 of rod 40.

To facilitate the easy removal of substantially all of the soil column within tube 30 and to also facilitate scarfing of the soil from the inner surface 34, teeth 52 are provided which are, as previously described, formed by a series of scallops 46 in the periphery of soil ejection plate 42. This scarfing action may be necessary where the soil is either moist or is of a compact consistency such as clay or the like. Note, however, that a circular disc or no disc at all may substitute for soil ejection plate 42.

Should it be desired that the hole be deepened, the device 10 may now be reassembled as previously described and hammered further against surface 48 to drive the lower end of tube 30 deeper into the soil. By repeating the process of removal of the device 10 to extract the column of soil which repeatedly accummulates within tube 30, the desired hole depth in the soil is achieved. Of course, a practical limit to the depth of hole-forming capability is the overall length of tube 30 and rod 40. However, that limitation is preselected at manufacture.

Although anvil 12 may be manufactured having a relatively longer anvil tube 18 which, in turn would facilitate driving the tube 30 a greater distance into the soil before the upper end 54 of rod 40 is encountered by hammering against surface 48, ejecting a longer column of soil from tube 30 becomes increasingly difficult, even by the subsequent hammering of surface 54 after the removal of anvil 12 as previously described. Thus, although during manufacture, anvil tube 18 may be fabricated of sufficient length that the entire length of tube 30 may be hammered into the soil before upper end surface 54 of rod 40 begins to extend upwardly from the upper end surface 48 of anvil tube 18, nonetheless, in use, repeated incremental forming of shorter hole segments may be desirable. Spraying a friction reducing material onto the inner surface 34 of tube 30 may facilitate the scarfing of the soil column from within tube 30, however, to reduce the number of repetitions of the above-described procedure.

Once a hole of the desired depth has been formed into the soil, anvil 12 has been disassembled and removed from the hole-making tube 14, and all soil has been scarfed from within tube 30 and the soil ejection rod 14 has been removed, the hole-making tube 14 may be now repositioned into the hole formed in the soil for the insertion of fertilizer. Funnel 38 is provided to facilitate this function. The desired quantity of fertilizer is poured into the funnel 38 and conveyed through tube 30 into the hole in the soil. Thereafter, the entire hole-making tube 14 is removed, leaving the column of fertilizer to slowly desolve within the hole. Prior to injecting the fertilizer into the hole, the soil ejection rod 16 may be used separately to loosen the soil on the inside of the hole. This is accomplished by inserting the soil ejection plate 42 into the hole first and, with a stroking motion and some lateral force applied, teeth 52 will scratch or scarf the inner surface of the hole to roughen and loosen the soil in preparation for more effective absorption of the fertilizer as it dissolves.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A device for preparing a fertilization hole in soil by removal of a column and for, thereafter, dispensing a quantity of fertilizer into the fertilization hole, said device comprising:
    an elongated relatively thin hole-making tube having an upper end and a lower end;
    an anvil tube having a lower end releasably connectable coaxially above and against said hole-making tube upper end;
    a coaxial funnel connected and uniformly extending diagonally upwardly from said hole-making tube upper end;
    said holemaking tube lower end is driven into the soil when said anvil tube upper end is struck and the fertilization hole is formed in the soil when said hole-making tube is removed from the soil thereafter;
    an elongated, slender ejection rod having an upper and lower end and slidably connectable coaxially within said anvil tube between a first position wherein said soil ejection rod upper end extends generally up to said anvil tube upper end and said ejection rod lower end is positioned upward from said holemaking tube lower end and a second position wherein said soil ejection rod lower end is near said holemaking tube lower end.

2. A device as set forth in claim 1, further comprising:
    a transverse soil ejection plate connected to said soil ejection rod lower end having a plurality of radially extending teeth which slidably mate against the inner surface of said hole-making tube for facilitating removal of each column of soil in said hole-making tube and for loosening the fertilization hole walls.

3. A device as set forth in claim 1, wherein:
    said hole-making tube lower end sharpened for enhanced soil penetration.

4. A device for preparing a fertilization hole in soil by removal of a column of soil and for, thereafter, dispensing a quantity of fertilizer into the fertilization hole, said device comprising:
    an elongated hole-making tube having an upper end and a lower end;
    an anvil tube having interconnectable structure at a lower end which is releasably connectable coaxially with, and against said hole-making tube upper end;
    said interconnectable structure including a locking pin retainer tube having a transverse locking pin extending therefrom coaxially connected and downwardly extending from said anvil tube lower end and a slotted washer coaxially connected generally to said hole-making tube upper end;
    said locking pin retainer tube insertable into, and rotatable with regard to, said washer such that said anvil tube and said hole-making tube are securely held in releasable coaxial end-to-end contact one to another;
    said anvil tube structured at its upper end to be struck with a hammer of the like such that said hole-making tube lower end is driven into the soil when said anvil tube is struck and the fertilization hole is formed in the soil when said hole-making tube is removed from the soil thereafter;
    an elongated, slender ejection rod having an upper and lower end and slidably connectable coaxially within said anvil tube between a first position wherein said soil ejection rod upper end extends generally up to said anvil tube upper end and said ejection rod lower end is positioned upward from said holemaking tube lower end and a second position wherein said soil ejection rod lower end is near said holemaking tube lower end.

5. A device as set forth in claim 4, further comprising:
    a transverse soil ejection plate connected to said soil ejection rod lower end having a plurality of radially extending teeth which slidably mate against the inner surface of said hole-making tube for facilitating removal of each column of soil in said hole-making tube and for loosening the fertilization hole walls.

6. A device as set forth in claim 4, further comprising:
    a coaxial funnel connected and uniformly extending diagonally upwardly from said hole-making tube upper end.

7. A device as set forth in claim 4, wherein:
    said hole-making tube lower end sharpened for enhanced soil penetration.

8. A device for preparing a fertilization hole in soil by removal of a column of soil and for, thereafter, dispensing a quantity of fertilizer into the fertilization hole, said device comprising:
    an elongated hole-making tube having an upper end and a lower end, said upper end having a funnel upwardly extending therefrom;
    an anvil tube having interconnectable structure at a lower end which is releasably connectable coaxially above and against said hole-making tube upper end;
    said interconnectable structure including a locking pin retainer tube having a transverse locking pin extending therefrom coaxially connected and downwardly extending from said anvil tube lower end and a slotted washer coaxially connected generally to said hole-making tube upper end;
    said locking pin retainer tube insertable into, and rotatable with regard to, said washer such that said anvil tube and said hole-making tube are securely held in releasable coaxial end-to-end contact one to another;
    said hole-making tube lower end is driven into the soil when said anvil tube upper end is struck and the fertilization hole is formed in the soil when said hole-making tube is removed from the soil thereafter;
    an elongated, slender ejection rod having an upper and lower end and slidably connectable coaxially within said anvil tube between a first position wherein said soil ejection rod upper end extends generally up to said anvil tube upper end and said ejection rod lower end is positioned upward from said hole-making tube lower end and a second position wherein said soil ejection rod lower end is near said hole-making tube lower end.

9. A device as set forth in claim 8, further comprising: a transverse soil ejection plate connected to said soil ejection rod lower end having a plurality of radially extending teeth which slidably mate against the inner surface of said hole-making tube for facilitating removal of each column of soil in said hole-making tube and for loosening the fertilization hole walls.

10. A device as set forth in claim 8, wherein: said hole-making tube lower end sharpened for enhanced soil penetration.

* * * * *